(12) United States Patent
Miyamoto et al.

(10) Patent No.: US 9,307,753 B2
(45) Date of Patent: Apr. 12, 2016

(54) FISHING REEL

(71) Applicant: Globeride, Inc., Tokyo (JP)

(72) Inventors: Issei Miyamoto, Tokyo (JP); Wataru Tsutsumi, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/609,682

(22) Filed: Jan. 30, 2015

(65) Prior Publication Data

US 2015/0216156 A1   Aug. 6, 2015

(30) Foreign Application Priority Data

Jan. 31, 2014   (JP) .................. 2014-017036

(51) Int. Cl.
| | |
|---|---|
| *A01K 89/01* | (2006.01) |
| *A01K 89/027* | (2006.01) |
| *A01K 89/02* | (2006.01) |
| *A01K 89/033* | (2006.01) |

(52) U.S. Cl.
CPC ........... *A01K 89/027* (2013.01); *A01K 89/0111* (2013.01); *A01K 89/02* (2013.01); *A01K 89/033* (2013.01)

(58) Field of Classification Search
CPC .............. A01K 89/01; A01K 89/0111; A01K 89/011222; A01K 89/011223; A01K 89/01929; A01K 89/0193; A01K 89/03
See application file for complete search history.

(56) References Cited

U.S. PATENT DOCUMENTS

| | | | | |
|---|---|---|---|---|
| 4,344,587 A | * | 8/1982 | Hildreth ............... | A01K 89/017 192/216 |
| 4,664,330 A | * | 5/1987 | Darden ................. | A01K 89/02 188/251 A |
| 5,318,246 A | * | 6/1994 | Ikuta ..................... | A01K 89/033 192/82 T |
| 5,904,309 A | * | 5/1999 | Takeuchi ........... | A01K 89/0108 242/232 |
| 6,176,446 B1 | * | 1/2001 | Sato ....................... | A01K 89/01 242/282 |
| 2003/0010856 A1 | * | 1/2003 | Katayama ............. | A01K 89/02 242/246 |
| 2009/0065620 A1 | * | 3/2009 | Halterman, Jr. ...... | A01K 89/027 242/246 |
| 2011/0042500 A1 | * | 2/2011 | Saito .................. | A01K 89/0111 242/224 |

FOREIGN PATENT DOCUMENTS

JP      10-136853      5/1998

OTHER PUBLICATIONS

Extended European Search Report dated Jul. 22, 2015 for Appln. No. 15153066.4

* cited by examiner

*Primary Examiner* — Emmanuel M Marcelo

(74) *Attorney, Agent, or Firm* — Pillsbury Winthrop Shaw Pittman, LLP

(57) ABSTRACT

One object is to provide a fishing reel including a drag device achieving stable drag performance. A fishing reel of the present invention includes: a spool around which a fishing line is to be wound by rotational operation of a handle; and a drag device configured to apply a braking force to the spool, wherein the drag device includes one or more drag washers, one or more lining washers in surface contact with the drag washers, and an operation member for adjusting a pressing force of the drag washers on the lining washers, and wherein the lining washers are provided with a grease having a viscosity of 800 mm²/s or higher.

3 Claims, 4 Drawing Sheets

FISHING REEL

CROSS-REFERENCE TO RELATED APPLICATIONS

This application is based on and claims the benefit of priority from Japanese Patent Application Serial No. 2014-017036 (filed on Jan. 31, 2014), the contents of which are hereby incorporated by reference in their entirety.

TECHNICAL FIELD

The present invention relates to a fishing reel, and in particular, to a fishing reel including a drag device for applying a braking force (drag force) when a fishing line wound around a spool is pulled out.

BACKGROUND

Fishing reels conventionally include a drag device as disclosed in, e.g., Japanese Patent Application Publication No. H10-136853 (the "'853 Publication"). When a fish is caught on a tackle, the drag device applies a braking force to a fishing line being pulled out. The spinning reel as disclosed in the '853 Publication is configured such that a drag knob can be adjusted to apply a desired braking force to the rotation of a spool rotatably retained on a spool shaft.

The drag device described above is included in various fishing reels such as spinning reels, double bearing reels, and single bearing reels. Spinning reels include front drag type and rear drag type. Typically, spinning reels include a plurality of brake members (lining washers, drag washers) adjacent to and in surface contact with each other so as to produce a braking force between a spool shaft and a spool.

The lining washers are formed of, e.g., a synthetic resin including felt, pulp, or reinforcement fiber or a punching resin; and the drag washers (mating members mating with the lining washers) are formed of a highly resistant metallic material and unrotatably fixed on a spool or a spool shaft. The lining washers (which may be constituted by multiple plates) are disposed to be retained between drag washers and are typically greased for smooth braking.

Such a drag device allows a user to adjust the drag force desirably in actual fishing. That is, the drag force can be increased by tightening a drag adjustment knob to produce a larger surface pressure on the lining washers, and the drag force can be reduced by loosening the drag adjustment knob to produce a smaller surface pressure on the lining washer.

As described above, the drag force varies in accordance with the surface pressure between the drag washers and the lining washers, or the frictional force therebetween. This frictional force serves as resistance and produces a drag force, which causes heat and wear between the drag washers and the lining washers. Such an effect can be suppressed by greasing the lining washers as described above.

Conventional drag devices suffer from an instable drag force during drag operation or a high impact upon switching from a static friction state to a dynamic friction state under a drag force. These problems are caused by several factors; and one of them may be an effect of the grease applied to the lining washers. The grease applied to the lining washers forms an oil film on the surface thereof. Conventionally, the grease cannot form a stable film between the lining washers and the drag washers, which causes the above problems. In particular, a large drag force produces a large surface pressure on the lining washers to break the oil film or causes the grease to penetrate a part of the lining washers, such that the surfaces of the lining washers are unevenly greased to have an instable oil film. Accordingly, when a rotational force is applied, the oil film may be broken by a shear force at portions having small thicknesses, thereby destabilizing the drag performance.

SUMMARY

The present invention addresses the above problems; and one object thereof is to provide a fishing reel including a drag device achieving stable drag performance.

As described above, the lining washers of the drag device included in a fishing reel is coated (soaked) with a grease. This grease suppresses heat and wear. In conventional fishing reels, the grease ordinarily has a viscosity that facilitates soaking of the lining washers (about 20 to 200 $mm^2/s$).

When the viscosity is low and thus the fluidity is high, it is difficult to form and maintain an even film all over the surface of the lining washers; and since the grease may penetrate the lining material such as felt, the thickness of the grease film may be partially small. To achieve stable drag performance, it is desirable to form a stable and even oil film between the lining washers and the drag washers. However, the above grease having a viscosity of about 20 to 200 $mm^2/s$ cannot form a stable oil film, because the grease tends to move particularly under a large pressure (large drag force).

Through various studies on the grease applied to the surface of the lining washer, the Inventors have found that viscosities higher than those of greases in conventional fishing reels enables the grease to form a stable film on the surface of the lining washers during frictional rotation of the drag washer and the lining washer, achieving a stable drag quality. The idea of the invention was thus obtained.

To overcome the above problem, a fishing reel according to the present invention comprises: a spool around which a fishing line is to be wound by rotational operation of a handle; and a drag device configured to apply a braking force to the spool, wherein the drag device includes one or more drag washers, one or more lining washers in surface contact with the drag washers, and an operation member for adjusting a pressing force of the drag washers on the lining washers, and wherein the lining washers are provided with a grease having a viscosity of 800 $mm^2/s$ or higher.

In such a fishing reel, the grease applied to the lining washers may have a viscosity (800 $mm^2/s$ or higher) higher than those of conventional greases and thus have a lower fluidity, making it possible to maintain an oil film formed between the lining washers and the drag washers. This may reduce thinner spots in the oil film on the surface of the lining washers (which causes instability of the oil film) and prevent the oil film from being broken by a shear force during relative rotations between the lining washers and the drag washers, thereby achieving a stable drag force. Particularly upon switch from static friction to dynamic friction, the oil film formed substantially even may smoothen the initial sliding motion of the lining washers and the drag washers to moderate the impact occurring when the drag force starts acting, thereby preventing a fishing line from being broken. Further, the oil film may be stably maintained between the lining washer and the drag washer under a dynamic frictional force and may be prevented from being broken, thus achieving stable drag performance.

In the above arrangement, if formed of a material like a resin or carbon fibers, the lining washers may be coated with the grease at the surface (oiled at the surface), and if formed of a material like felt, the lining washers may be internally soaked with the grease. The viscosity of the grease should be 800 $mm^2/s$ or higher; but the desirable range is different between a spinning reel and a double bearing reel. In case of a double bearing reel, the drag device may be mounted on a handle shaft portion and, when the spool is pulled out, there is an effect of a gear ratio between a drive gear provided on a handle shaft and a pinion gear provided on a spool shaft. Therefore, the desirable viscosity is higher compared to a spinning reel. More specifically, according to evaluation by a plurality of testers, viscosities of 900 to 2,500 mm$^2$/s resulted satisfactorily in a spinning reel, and viscosities of 5,000 to 23,000 mm$^2$/s resulted satisfactorily in a double bearing reel, as will be described later. The upper limit of the viscosity is not particularly specified in the technical idea of the present invention. It is possible to use a highly viscous grease having a viscosity of about 100,000 mm$^2$/s.

The present invention provides a fishing reel including a drag device achieving stable drag performance.

DESCRIPTION OF EXAMPLE EMBODIMENTS

Figure 1:
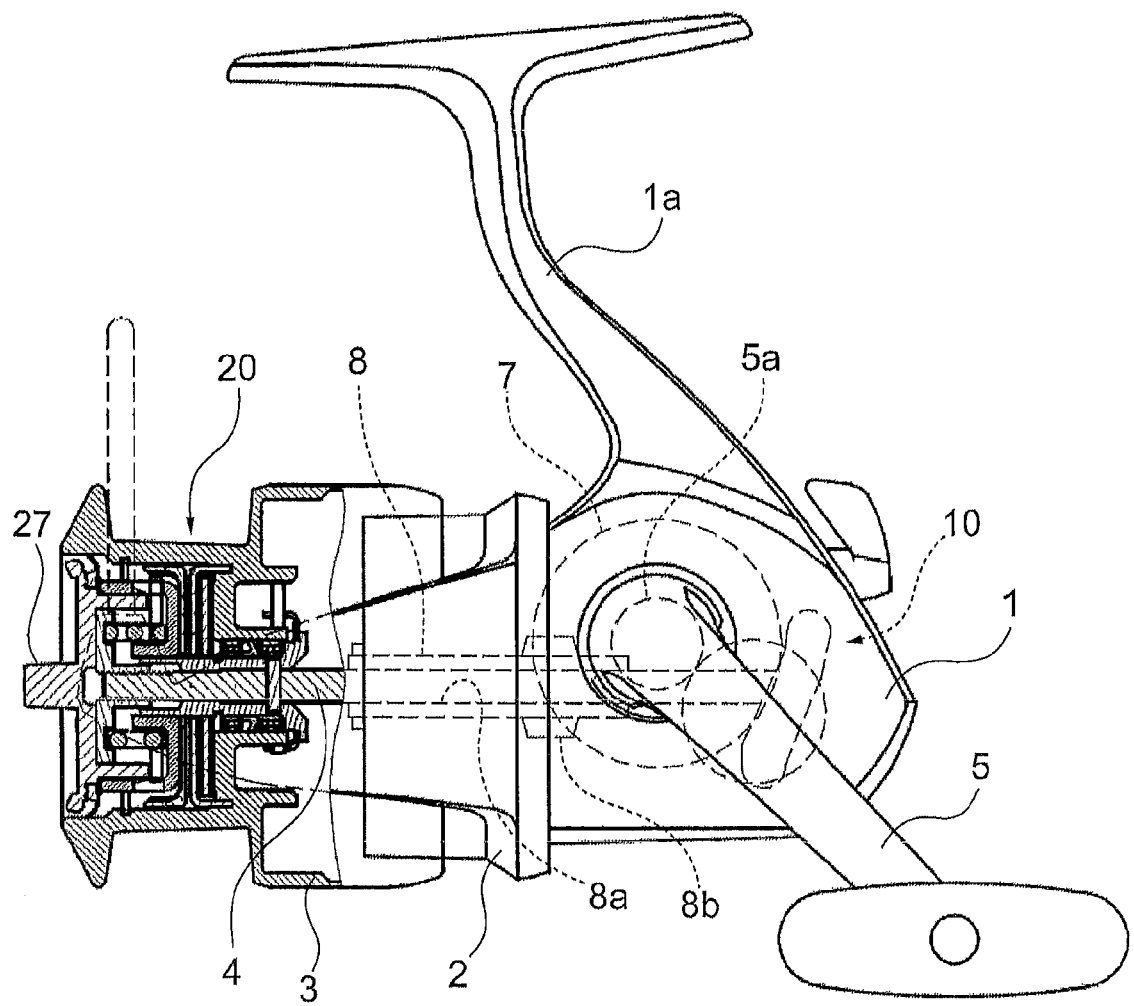
FIG. 1 shows an embodiment of the fishing reel (spinning reel) according to the present invention, including internal structure of a spool.
Figure 2:
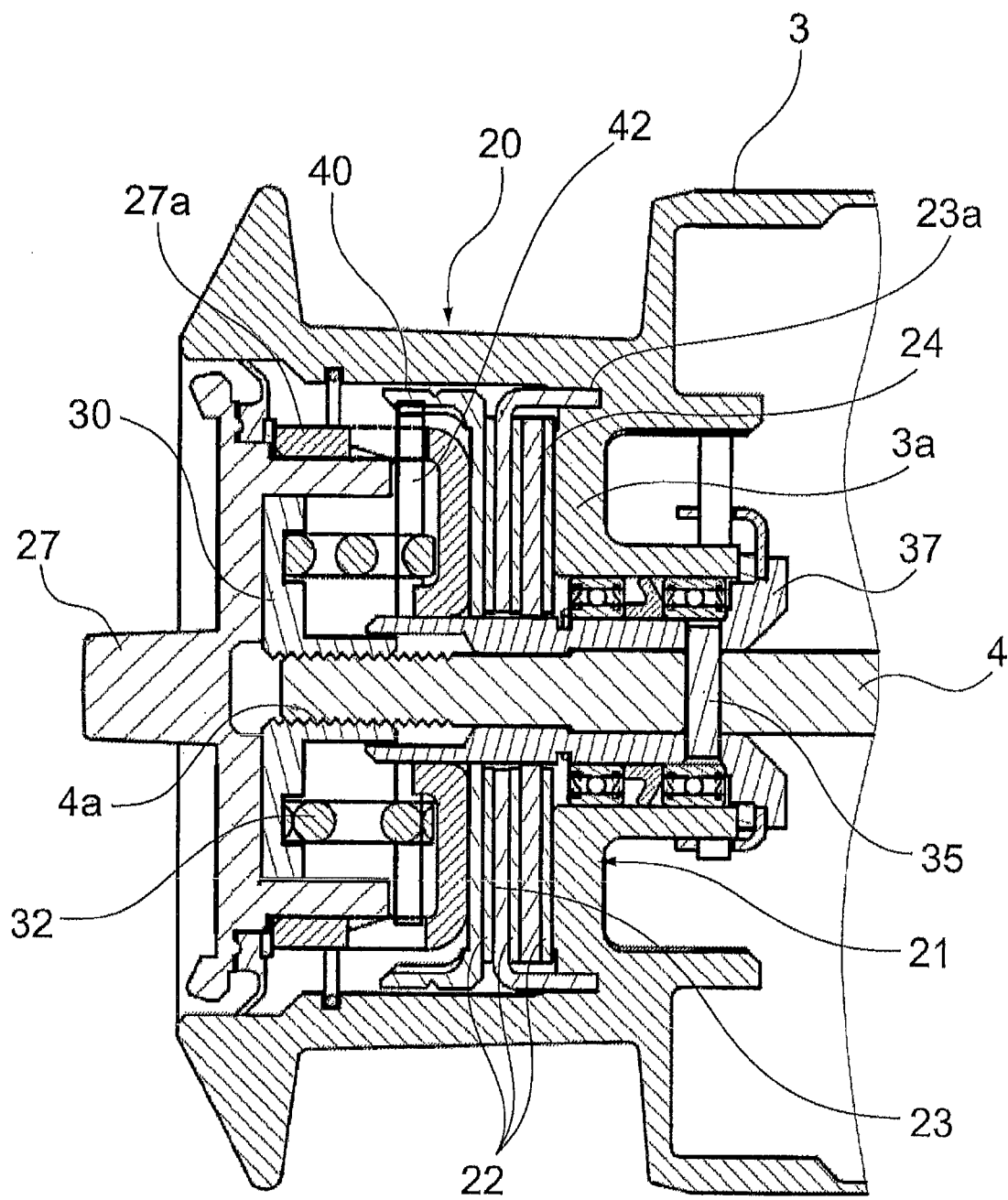
FIG. 2 is an enlarged view of a spool portion of the fishing reel shown in FIG. 1.
Figure 3:
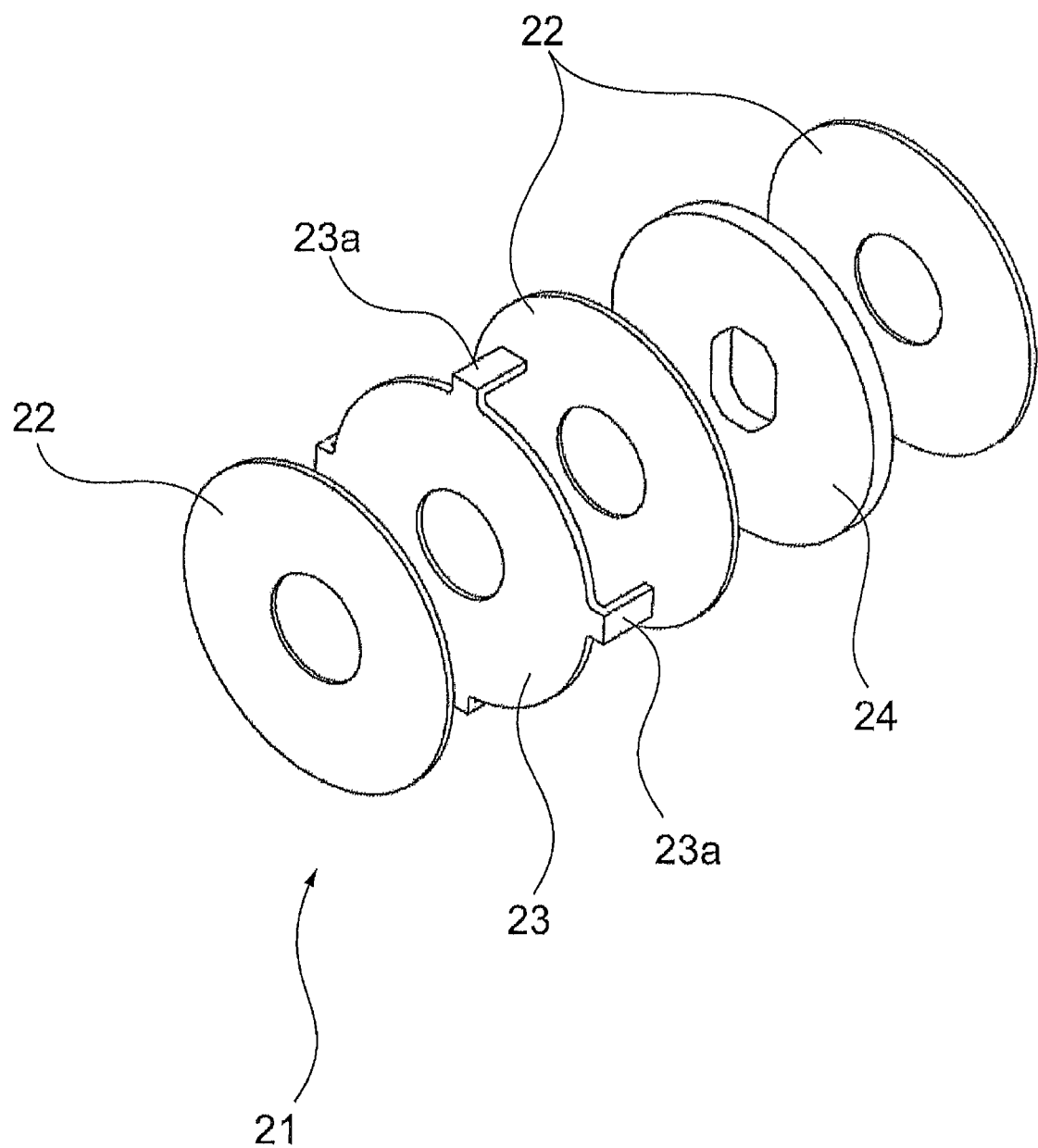
FIG. 3 is a perspective view showing an arrangement of drag washers and lining washers of the drag device shown in FIG. 2.

Embodiments of a fishing reel according to the present invention will be hereinafter described with reference to the drawings. FIGS. 1 to 3 show an embodiment of a fishing reel (spinning reel) according to the present invention, wherein FIG. 1 shows an internal structure of a spool, FIG. 2 is an enlarged view of a spool portion, and FIG. 3 is a perspective view showing an arrangement of drag washers (mating members) and greased lining washers of a drag device.

The reel body 1 of the spinning reel may be integrated with a reel leg 1a to be mounted on a fishing rod; and the reel body 1 may include, in front of the reel leg 1a, a rotor 2 rotatably supported and a spool 3 which is supported so as to be able to move back and forth in synchronization with the rotation of the rotor 2 and around which a fishing line is to be wound.

In the reel body 1, a handle shaft 5a may be rotatably supported and may have a handle 5 mounted on a projecting end thereof. The handle shaft 5a may be engaged with a publicly known wind drive mechanism, which may be mounted on the handle shaft and include a drive gear 7 having internal teeth, and a pinion gear 8 meshing with the drive gear 7, extending in the direction orthogonal to the handle shaft 5a, and having therein a hollow portion 8a extending axially. The pinion gear 8 may have a tooth portion 8b formed in the rear end thereof; and the tooth portion 8b may mesh with the drive gear 7.

Through the hollow portion 8a of the pinion gear 8 may be inserted a spool shaft 4 rotatably supporting the spool 3, so as to be movable back and forth in the axial direction. A publicly known oscillation mechanism 10 may be engaged with the rear portion of the spool shaft 4. When the handle 5 is rotationally operated, the spool shaft 4 (spool 3) may be reciprocated back and forth via the oscillation mechanism 10. The front portion of the pinion gear 8 may be squeezed with a rotor nut to fix the rotor 2 on the pinion gear 8. That is, the winding operation of the handle 5 may cause the rotor 2 to rotate; and in synchronization with this rotation, the spool 3 may be reciprocated back and forth, and the fishing line may be evenly wound around the spool 3 via a fishing line guide (line roller) rotating along with the rotor.

The spool 3 may be rotatably supported by the drag device 20 for applying a braking force to the spool shaft 4. The drag device 20 may be housed in the spool 3 (a cylindrical internal space, or a cavity). As will be described later, the drag device 20 may include lining washers 22 and drag washers 23, 24 (collectively referred to as a braking member 21), a pressing member 27a applying a pressing force on the washers along the axial direction, and a drag adjustment knob (operation member) 27 for adjusting a pressing force on the pressing member 27a.

In the distal end of the spool shaft 4 may be formed a male thread 4a, on which a nut 30 may be fitted so as to be unrotatable but movable in the axial direction. The nut 30 may be mounted and fixed on the drag adjustment knob 27 and pressed on the drag adjustment knob 27 by a spring force of a spiral spring 32 installed in the pressing member 27a formed in a cup shape. On the front portion of the spool shaft 4 may be integrally connected a spool metal 37 via a pin 35 (so as to surround the spool shaft); and a spring bearing 40 (sounding body) may be unrotatably fitted on the outer circumference of the spool metal 37. The spring bearing may be formed in a cup shape and have indentations in the inner circumference thereof. (In the embodiment, the spring bearing 40 may also be included in the brake member 21). An end of an annular spring 42 locked by the pressing member 27a may be engaged with the indentations of the spring bearing 40, such that the drag adjustment knob 27 can be rotated with click-stops. That is, when the drag adjustment knob 27 is rotated either clockwise or counterclockwise, the nut 30 may be advanced or retracted with respect to the spool shaft 4, so as to adjust the spring force of the spiral spring 32 and produce a desired drag force on the brake member 21 of the drag device 20.

As stated above, the brake member 21 may include the lining washers 22, the drag washers 23, 24, and the spring bearing 40 arranged adjacent to and in surface contact with each other. These members may be formed in a ring shape through which the spool shaft 4 may be inserted at the middle. The lining washers 22 may be formed of, e.g., felt so as to be capable of being soaked with a grease (described later) and may be rotatably disposed between the spring bearing 40 and the drag washer 23, between the drag washer 23 and the drag washer 24, and between the drag washer 24 and the inner surface 3a of the spool 3. The drag washers 23, 24 and the spring bearing 40 may serve as mating members of the lining washers and may be formed of a metal such as SUS.

The spring bearing 40 may be unrotatably fitted on the spool metal 37, the drag washer 23 may have a bent portion 23a formed at the outer circumferential end and engaged with the spool 3 and may be unrotatably fixed on the spool 3 so as to be rotatable integrally with the spool 3, and the drag washer 24 may be unrotatably fitted on the spool metal 37. That is, the brake member 21 of this embodiment may include the spring bearing 40 unrotatably fixed on the spool shaft (spool metal), the drag washer 23 unrotatably fixed on the spool, the drag washer 24 unrotatably fixed on the spool 3, and a plurality of lining washers 22 disposed between these members. When the pressing member 27a is pressed against the spring bearing 40, the pressing force of the drag washers on the lining washers can be adjusted so as to produce a drag force on the spool 3. The drag force can be adjusted by rotationally operating the drag adjustment knob 27.

The lining washer 24 may be greased, although not shown. Depending on the material, the lining washers 22 may be either coated or soaked with the grease to form an oil film on the surface. The grease should have a viscosity of 700 mm$^2$/s or higher to form and maintain a substantially even oil film on the lining washers as compared to greases used for conventional drag devices of fishing reels. More specifically, the evaluation test described later revealed that, in a spinning reel, the viscosity should be 800 mm$^2$/s or higher for satisfactory results, and should desirably be 900 to 2,500 mm$^2$/s, or more desirably be 1,100 to 1,900 mm$^2$/s.

The grease having such a viscosity may include, e.g., a mineral oil as a base oil, a thickener such as lithium soap, and a solid lubricant such as polytetrafluoroethylene (PTFE) mixed at a predetermined ratio. The following is a description on the contents of the evaluation test using greases of different viscosities and on drag quality produced with greases having high viscosities.

In the evaluation test, a plurality of same spinning reels were each provided with a grease having a different viscosity on the lining washers; and five testers (A to E) used these spinning reels in actual fishing at a controlled fishing site for evaluating the operability of the reels. The testers used their own rods and thin lines (2.0 lb) wound around the spools. For evaluation, each tester used each spinning reel for about five to ten fishes as a target. Each tester applied drag setting as usual (accordingly, the initial drag settings were different between the testers), and evaluated the spinning reels based generally on hooking of a fish, initial sliding motion in the drag upon hooking a fish, stopping of the drag, ease of landing, the frequency and necessity of operations for preventing loss of a hooked fish and line breakage (adjustment of a drag knob, hold-down of the spool, operations on the rod). The evaluation was made in four ranks symbolized with "⊚" for excellent operability, "○" for good operability, "Δ" for somewhat good operability, and "x" for unimproved (almost unimproved) as compared to conventional spinning reels.

These testers owns and usually uses spinning reels including a grease applied to the drag devices having a viscosity of 20 to 200 mm$^2$/s. The evaluation was made for each of the greases having different viscosities, wherein a plurality of spinning reels each including a grease on the lining washers were mounted on rods usually used by the testers. That is, the testers can sense the difference in operability from their own spinning reels due to the difference between the greases. Since the operability may vary depending on the species and sizes of the caught fishes, the testers caught at least five fishes for fair evaluation. The following table shows the result.

TABLE 1

|  | A | B | C | D | E |
|---|---|---|---|---|---|
| 600 | X | Δ | Δ | X | Δ |
| 700 | Δ | Δ | Δ | Δ | ○ |
| 800 | Δ | Δ | ○ | ○ | ○ |
| 900 | Δ | ○ | ○ | ○ | ⊚ |
| 1000 | ○ | ○ | ○ | ○ | ⊚ |
| 1100 | ○ | ○ | ⊚ | ○ | ⊚ |
| 1300 | ⊚ | ⊚ | ⊚ | ⊚ | ⊚ |
| 1500 | ⊚ | ⊚ | ○ | ⊚ | ○ |
| 1700 | ⊚ | ⊚ | ○ | ○ | ○ |
| 1900 | ⊚ | ○ | ○ | ⊚ | ○ |
| 2100 | ○ | ○ | Δ | ○ | Δ |
| 2300 | ○ | ○ | Δ | ○ | Δ |
| 2500 | ○ | Δ | Δ | ○ | Δ |

TABLE 1-continued

|  | A | B | C | D | E |
|---|---|---|---|---|---|
| 2700 | Δ | X | Δ | Δ | X |
| 2900 | Δ | X | X | Δ | X |
| 3100 | Δ | X | X | Δ | X |
| 3300 | Δ | X | X | X | X |

※ Viscosities (mm$^2$/s) in vertical and testers in horizontal

According to the above evaluation, all the testers felt that greases of higher viscosities (700 mm$^2$/s or higher) produced better operability. That is, a viscosity of 600 mm$^2$/s produced a result somewhat better than conventional spinning reels (three of the testers found somewhat better operability and the two found no improvement); for viscosities of 700 mm$^2$/s or higher, all the testers found better operability; and for viscosities ranging from 800 to 2,500 mm$^2$/s, all the testers found better operability. In particular, viscosities ranging from 1,100 to 1,900 mm$^2$/s produced high evaluation, and viscosities ranging from 1,300 to 1,500 mm$^2$/s produced the highest evaluation. This evaluation test revealed that viscosities a certain degree higher than 3,000 mm$^2$/s produce better operability than conventional spinning reels (even viscosities ranging from 3,100 to 3,300 mm$^2$/s produced somewhat high evaluation); but excessively high viscosities may unfavorably strengthen the tendency of heavy initial spool-free rotation in producing a drag force. Also, it may be presumably difficult to internally soak the lining washers formed of felt with such greases. Therefore, the upper limit of the viscosity of a grease used should preferably be 3,000 mm$^2$/s for effectively increasing the operability of an ordinary spinning reel in actual fishing.

The reason for better evaluation compared to conventional spinning reels may be, e.g., that hooking is secure because idling of the spool is restricted upon a raise of the rod for hooking under the condition where the drag force is set lower for preventing line breakage (there is less need of holding down the spool or making a drag adjustment for hooking), that there is less possibility in handling a fish that the fish intermittently pulls the line to break its lips or the line (there is less need of drag adjustment for preventing such cases), and that there is less need of strengthening the drag force in a hurry for landing the fish. That is, viscosities of the grease in the above range may make it possible to prevent a fish from breaking its lips or a thin line and enhance the operability of the spinning reel in handling a fish.

Further, in an evaluation test of double bearing reels by the same testers A to E, the testers felt that higher viscosities (800 mm$^2$/s or higher) produce somewhat better operability than conventional double bearing reels. However, as stated above, in connection with the gear ratio in the portion including the drag device, double bearing reels are different from spinning reels in the amount of rotation at the drag washers and the lining washers during releasing operation of the spool and in the arrangement of the washer portion (drag washers, lining washers) included in the drag device. Therefore, the desirable range of the viscosity of the grease was somewhat higher than that of spinning reels. Thus, as shown in Table 2, the evaluation test was conducted in a range where relatively high evaluation can be obtained.

As with the spinning reels, the evaluation was made for each of the greases having different viscosities, wherein a plurality of double bearing reels (with gear ratios ranging from 6.8 to 9.1) each including a grease on the lining washers were mounted on rods usually used by the testers. That is, the testers can sense the difference in operability from their own double bearing reels due to the difference between the greases.

TABLE 2

|  | A | B | C | D | E |
|---|---|---|---|---|---|
| 3000 | △ | X | X | △ | △ |
| 5000 | ○ | △ | △ | △ | ○ |
| 7000 | ○ | △ | ○ | ○ | ◎ |
| 9000 | ◎ | ○ | ○ | ○ | ◎ |
| 11000 | ◎ | ◎ | ◎ | ◎ | ◎ |
| 13000 | ◎ | ◎ | ◎ | ◎ | ○ |
| 15000 | ○ | ◎ | ◎ | ◎ | ○ |
| 17000 | ○ | ○ | ◎ | ○ | △ |
| 19000 | △ | ○ | ○ | ○ | △ |
| 21000 | △ | ○ | ○ | ○ | △ |
| 23000 | △ | ○ | ○ | △ | △ |
| 25000 | △ | △ | △ | X | X |
| 27000 | X | △ | △ | X | X |
| 29000 | X | △ | △ | X | X |
| 31000 | X | X | △ | X | X |

※ Viscosities (mm²/s) in vertical and testers in horizontal

According to the above evaluation, all the testers felt that greases of higher viscosities (5,000 mm²/s or higher) produced better operability. That is, a viscosity of 3,000 mm²/s produced a result somewhat better than conventional double bearing reels (three of the testers found somewhat better operability and the two found no improvement); for viscosities of 5,000 mm²/s or higher, all the testers found better operability; and for viscosities ranging from 5,000 to 23,000 mm²/s, all the testers found better operability. In particular, viscosities ranging from 7,000 to 17,000 mm²/s produced high evaluation, and viscosities ranging from 11,000 to 13,000 mm²/s produced the highest evaluation. This evaluation test revealed that viscosities a certain degree higher than 25,000 mm²/s produces better operability than conventional double bearing reels. The upper limit cannot be specified since it depends on the gear ratio and the material of the lining washers; but it is presumed that even a viscosity of about 100,000 mm²/s produces better operability as compared to conventional double bearing reels.

Figure 4:
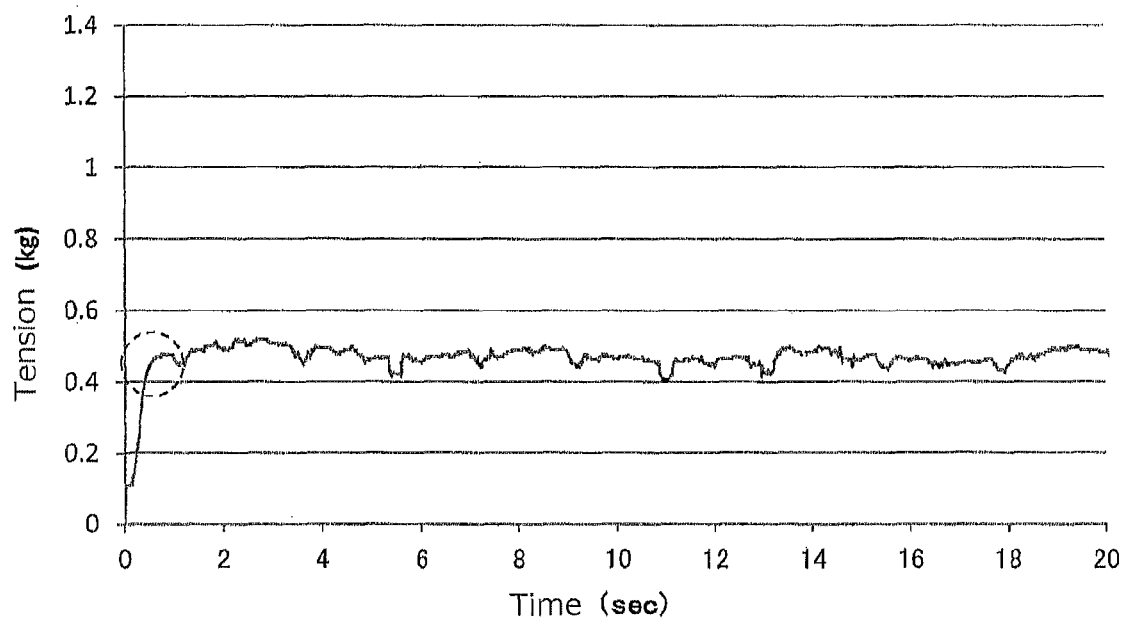
FIG. 4 shows graphs of a pull-out test of the drag device, wherein the upper graph shows a result obtained with a grease having a high viscosity (1,280 mm$^2$/s) applied to the lining washers, and the lower graph shows a result obtained with a grease having an ordinary viscosity (20 mm$^2$/s) applied to the lining washers.
Figure 4:
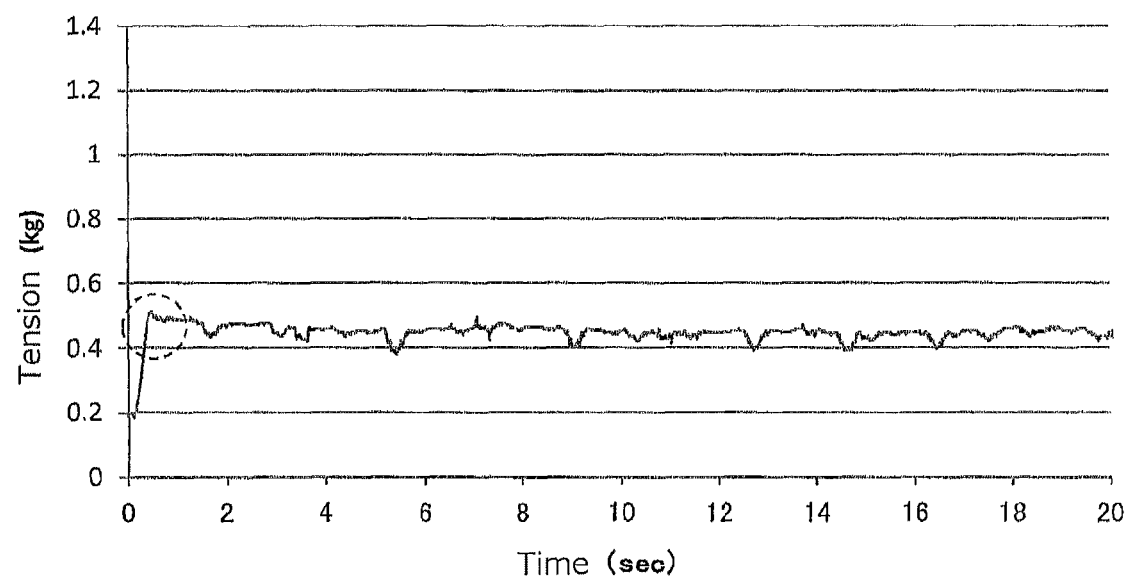

FIG. 4 shows tension variation with time measured in a pull-out test from the spool for different viscosities of the grease applied to the lining washer in the same drag devices (the upper graph is the result for a viscosity of 1,280 mm²/s, and the lower graph is the result for a viscosity of 20 mm²/s) (conditions other than the viscosity of the grease were the same). The drag devices had a multi-plate structure wherein three lining washers are retained between three drag washers. In these drag devices, the drag force was set to 300 g, and the pull-out speed of the fishing line from the spool was set to 1 km/h. Thus, the tension variation on the fishing line was measured with time.

In these graphs, the portions encircled with broken lines represent the moment when the fishing line starts to be pulled out and the drag device starts sliding (switches from the static friction state to the dynamic friction state). As is obvious from comparison between the two graphs, a grease of a higher viscosity applied to the lining washers moderated the tension variation measured when the drag device starts sliding. This indicates that the oil film between the lining washers and the drag washers are stably maintained and prevented from being broken by shearing action during relative rotation between the washers, and that there is no abrupt tension variation at the moment when the washers start sliding. That is, a grease of a high viscosity restricts abrupt tension variation and prevents line breakage or eliminates the need of an operation for preventing line breakage, resulting in better operability as described above.

Embodiments of the present invention are not limited to the above descriptions and are susceptible to various modifications. In the above embodiment of the spinning reels, the drag device may have three lining washers, but the number of the lining washers is not limited thereto. Further, the material of the drag washers and the lining washers are not particularly specified as long as greases of the above viscosities can be retained. The present invention can be applied to drag devices of double bearing reels, electric reels, and single bearing reels, in addition to spinning reels in the above embodiments.

What is claimed is:

1. A fishing reel comprising:
   a spool around which a fishing line is to be wound by rotational operation of a handle; and
   a drag device configured to apply a braking force to the spool,
   wherein the drag device includes one or more drag washers, one or more lining washers each in surface contact with one or more of the drag washers, and an operation member for adjusting a pressing force of the drag washers on the lining washers, and
   wherein the lining washers are provided with a grease having a viscosity of 800 mm²/s or higher.

2. The fishing reel of claim 1, wherein the fishing reel is a spinning reel, wherein the grease has a viscosity of 900 to 2,500 mm²/s.

3. The fishing reel of claim 1, wherein the fishing reel is a double bearing reel, and wherein the grease has a viscosity of 5,000 to 23,000 mm²/s.

* * * * *